(12) United States Patent
Kerkes

(10) Patent No.: US 11,805,040 B2
(45) Date of Patent: *Oct. 31, 2023

(54) METHODS AND APPARATUS TO REMOVE INFORMATION FROM RECORDS

(71) Applicant: The Nielsen Company (US), LLC, New York, NY (US)

(72) Inventor: Joseph Kerkes, Lutz, FL (US)

(73) Assignee: The Nielsen Company (US), LLC, New York, NY (US)

(*) Notice: Subject to any disclaimer, the term of this patent is extended or adjusted under 35 U.S.C. 154(b) by 228 days.

This patent is subject to a terminal disclaimer.

(21) Appl. No.: 16/916,071

(22) Filed: Jun. 29, 2020

(65) Prior Publication Data

US 2020/0403896 A1 Dec. 24, 2020

Related U.S. Application Data

(63) Continuation of application No. 16/132,061, filed on Sep. 14, 2018, now Pat. No. 10,700,955.

(51) Int. Cl.
| | |
|---|---|
| *H04L 43/0876* | (2022.01) |
| *H04L 12/66* | (2006.01) |
| *H04L 43/12* | (2022.01) |
| *H04L 65/612* | (2022.01) |
| *H04N 21/442* | (2011.01) |
| *H04W 24/08* | (2009.01) |
| *H04L 43/028* | (2022.01) |
| *H04N 21/658* | (2011.01) |
| *H04W 84/12* | (2009.01) |

(52) U.S. Cl.
CPC ........ *H04L 43/0876* (2013.01); *H04L 12/66* (2013.01); *H04L 43/028* (2013.01); *H04L 43/12* (2013.01); *H04L 65/612* (2022.05); *H04N 21/44224* (2020.08); *H04N 21/44227* (2013.01); *H04N 21/6582* (2013.01); *H04W 24/08* (2013.01); *H04W 84/12* (2013.01)

(58) Field of Classification Search
CPC ..... H04L 43/0876; H04L 12/66; H04L 43/12; H04L 65/4084; H04L 43/028; H04L 65/612; H04N 21/44224; H04N 21/44227; H04N 21/6582; H04W 84/12; H04W 24/08
See application file for complete search history.

(56) References Cited

U.S. PATENT DOCUMENTS

| | | | |
|---|---|---|---|
| 7,197,560 B2* | 3/2007 | Caslin ................ | H04L 63/0272 709/227 |
| 8,363,586 B2 | 1/2013 | Rosario et al. | |
| 9,009,243 B2 | 4/2015 | Anderson et al. | |
| 9,647,779 B2 | 5/2017 | Besehanic | |

(Continued)

*Primary Examiner* — Omar J Ghowrwal

(57) ABSTRACT

Methods and apparatus to exclude network communication traffic from media monitoring records are disclosed herein. An example apparatus includes a first communication radio to collect records of network traffic on a communication network and a second communication radio to transmit the records identifying a portion of the network traffic to an audience measurement entity. The example apparatus further includes a MAC address determiner to determine the MAC address of the second communication radio and a record filter to remove the network communication associated with the MAC address from the records.

21 Claims, 5 Drawing Sheets

(56) References Cited

U.S. PATENT DOCUMENTS

| | | |
|---|---|---|
| 9,801,059 B2 | 10/2017 | Ziv et al. |
| 10,700,955 B2 | 6/2020 | Kerkes |
| 2001/0012296 A1 | 8/2001 | Burgess et al. |
| 2002/0021701 A1 | 2/2002 | Lavian et al. |
| 2004/0095897 A1 | 5/2004 | Vafaei |
| 2011/0239289 A1* | 9/2011 | Wang .................. H04L 65/1006 709/224 |
| 2012/0158593 A1 | 6/2012 | Garfinkle et al. |
| 2013/0007298 A1 | 1/2013 | Ramaswamy et al. |
| 2014/0317270 A1 | 10/2014 | Besehanic |
| 2015/0039719 A1* | 2/2015 | Berk .................... H04L 45/7453 709/217 |
| 2017/0099662 A1 | 4/2017 | Thubert et al. |
| 2018/0077555 A1 | 3/2018 | Montemurro et al. |
| 2018/0103404 A1 | 4/2018 | Emmanuel et al. |
| 2018/0124009 A1* | 5/2018 | Kerkes ................ H04L 61/6009 |
| 2018/0152836 A1 | 5/2018 | Milton et al. |
| 2020/0019556 A1* | 1/2020 | Poddar .............. G06F 16/90344 |

\* cited by examiner

METHODS AND APPARATUS TO REMOVE INFORMATION FROM RECORDS

RELATED APPLICATION

This patent arises from a continuation of U.S. patent application Ser. No. 16/132,061, entitled "METHODS AND APPARATUS TO EXCLUDE NETWORK COMMUNICATION TRAFFIC FROM MEDIA MONITORING RECORDS," filed on Sep. 14, 2018. U.S. patent application Ser. No. 16/132,061 is incorporated herein in its entirety. Priority to U.S. patent application Ser. No. 16/132,061 is hereby claimed.

FIELD OF THE DISCLOSURE

This disclosure relates generally to media monitoring and, more particularly, to methods and apparatus to exclude network communication traffic from monitoring records.

BACKGROUND

In recent years, media devices have been provided with Internet connectivity and the ability to retrieve media from the Internet. As such, media exposure has shifted away from conventional methods of presentation such as broadcast television, towards presentation via consumer devices accessing media via the Internet.

Media providers and/or other entities such as, advertising companies, broadcast networks, etc. are often interested in the viewing, listening, and/or media behavior of audience members and/or public in general. The media usage and/or exposure habits of monitored audience members, as well as demographic data about the audience members, are collected and used to statistically determine the size and demographics of an audience of interest.

Traditionally, audience measurement entities determine audience engagement levels for media programming and/or advertisements based on registered panel members. That is, an audience measurement entity enrolls people who consent to being monitored into a panel. The audience measurement entity then monitors those panel members to collect media measurement data identifying media (e.g., television programs, radio programs, movies, DVDs, etc.) presented to those panel members. In this manner, the audience measurement entity can determine exposure measures for different media (e.g., content and/or advertisement) based on the collected media measurement data.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
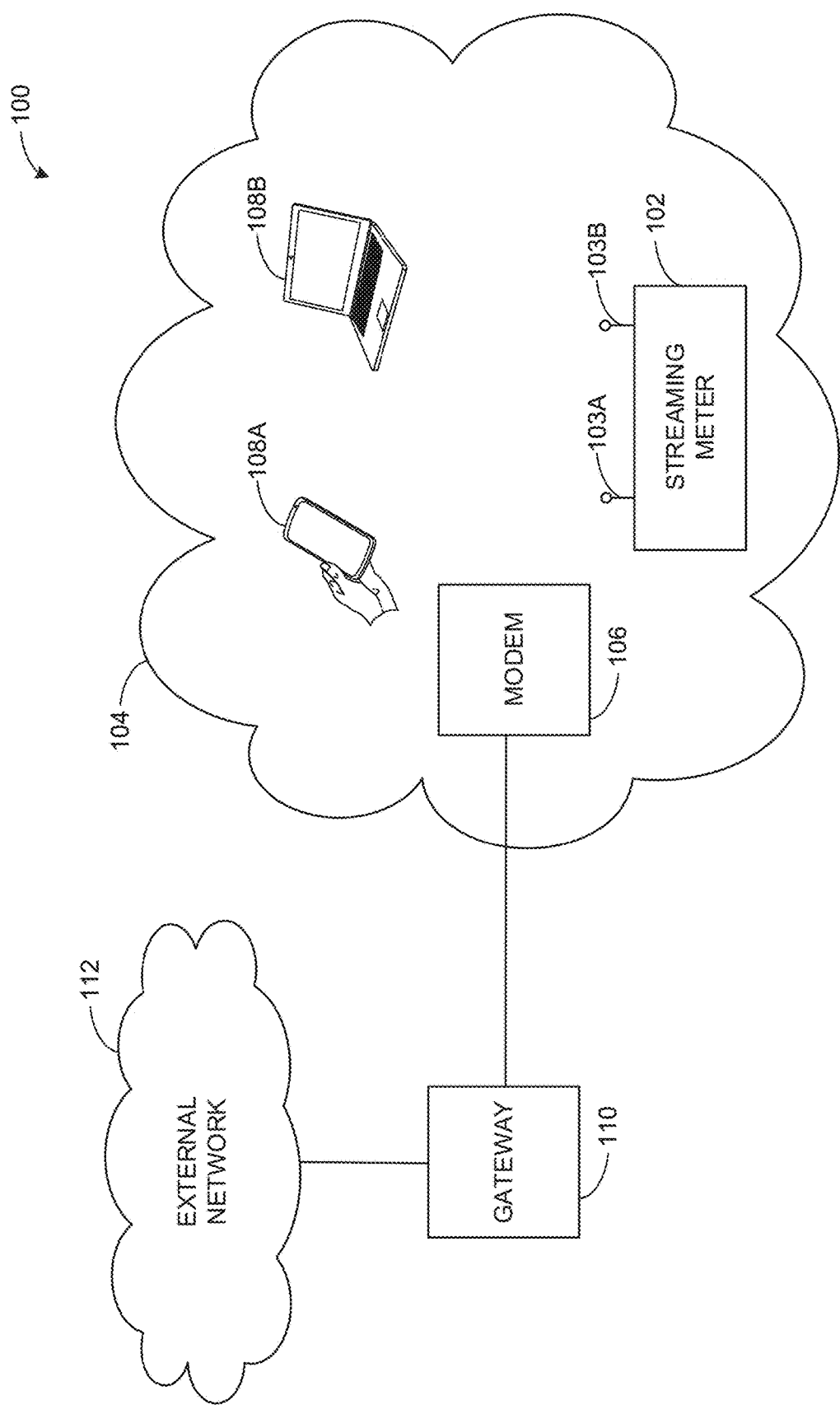
FIG. 1 is a block diagram of an example environment in which the teachings of this disclosure may be implemented.

Media monitors can be installed into consenting households to monitor media consumed in that household. With recent advances in Internet technology, streaming services such as YouTube® and Netflix®, have become a major source of media for consumers at home. Certain types of media monitors, called streaming meters, allow media streamed over a network (e.g., the Internet, etc.) to be monitored. In some examples, streaming meters monitor home wireless networks (e.g., WiFi networks, etc.) to collect records of media streamed to media devices in the home. Records of streamed media are then sent to a central facility of an audience measurement entity (AME) via a back channel communication.

Streaming meters often use Ethernet connections to transfer information to the central facility. However, in some instances, an Ethernet connection may not be available or desirable. For example, in some homes, the layout of the home may make connecting an Ethernet connection to a streaming meter impractical. Another means of sending a back channel communication is over the same wireless network that the streaming meter is monitoring. In this example, the streaming meter may use an additional communication radio(s). For example, the streaming meter may use a first radio (e.g., a monitoring radio) to monitor streaming media and a second radio (e.g., a backchannel radio) to send back channel communications. However, if the backchannel radio uses the same WiFi network as the monitoring radio, the back channel communications will also be monitored and collected by the monitoring radio of the streaming meter.

Methods and apparatus disclosed herein enable the use of a wireless network for a back channel communication while preventing back channel communications from being monitored by determining the media access control address (MAC address) of the back channel communication radio and excluding, from monitoring records, communications originating from the determined MAC address. An example method disclosed herein includes monitoring a wireless communication network using a first communication radio for monitoring the network and communicating monitoring data to an audience measurement entity using a second communication radio. This example method includes filtering communications for records based on an identified MAC address at the second communication radio.

As used herein, the term "media" includes any type of content and/or advertisement delivered via any type of distribution medium. Thus, media includes television programming or advertisements, radio programming or advertisements, movies, web sites, streaming media, etc. Example methods, apparatus, and articles of manufacture disclosed herein monitor media presentations at media devices. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc. In some examples, media monitoring information is aggregated to determine ownership and/or usage statistics of media devices, relative rankings of usage and/or ownership of media devices, types of uses of media devices (e.g., whether a device is used for browsing the Internet, streaming media from the Internet, etc.), and/or other types of media device information. In examples disclosed herein, monitoring information includes, but is not limited to, media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or user-identifying information (e.g., demographic information, a user identifier, a panelist identifier, a username, etc.).

FIG. 1 is a block diagram of an example environment 100 in which the teachings of this disclosure may be implemented. The example environment 100 includes an example streaming meter 102 that interfaces with an example monitoring radio 103A (e.g., a first communication radio) and an example backchannel radio 103B (e.g., a second communication radio). The example streaming meter 102 monitors an example local network 104 associated with an example modem 106. The example local network 104 communicatively couples the example modem 106, an example first media device 108A, an example second media device 108B and other devices (not shown) on the local network 104. The example modem 106 is connected with an example gateway 110 which interface an example external network 112.

In the illustrated example, the environment 100 is a home of a consumer. In other examples, the environment 100 can be any area in which streaming media is viewed (e.g., public transit, a business, etc.). The example streaming meter 102 is a media monitoring device that is installed in the environment 100 to collect records of activity on the example local network 104. In the illustrated example, the streaming meter 102 generates records of wireless communications transmitted by the first media device 108A, communications transmitted by the second media device 108B, etc. The streaming meter 102 instructs the monitoring radio 103A to monitor traffic on the local network 104. The streaming meter 102 processes the monitored traffic to create records of the traffic. In the illustrated example, the communications are wireless communications snooped by the monitoring radio 103A. Alternatively, the communications may be any type of communication captured using any type of technique.

In the illustrated example, the streaming meter 102 instructs the backchannel radio 103B to transmit the collected records of traffic over the example local network 104 to a central facility of an AME via the example gateway 110 and the external network 112 (e.g., a backchannel communication). The example streaming meter 102 identifies communication parameters (e.g., MAC address, etc.) associated with this communication. In some examples, the streaming meter 102 filters records associated with the identified parameters such that the records associated with the identified parameters are not transmitted to the central facility. The example backchannel radio 103B and/or the example monitoring radio 103A can be implemented by any suitable hardware component for monitoring a network (e.g., a network card, an antenna, a WiFi dongle, etc.).

The example local network 104 is a wireless local area network that enables devices connected to the local network 104 to be in communication with other devices connected to the local network 104. As used herein "in communication," including variants thereof, encompasses direct communication and/or indirect communication through one or more intermediary components and does require constant communication, but rather includes selective communication at periodic or aperiodic intervals, as well as one-time events. In the illustrated example, the local network 104 is a WiFi network. In other examples, the local network 104 may any other suitable type of network (e.g., Bluetooth, a cellular network, a wired network, etc.). As used herein, "network traffic" refers to communications between devices connected to the local network 104 (e.g., the first media device 108A and the second media device 108B) as well as communications between the modem 106 and connected devices.

In other examples, the local network 104 may include other network devices such as an ethernet switch, an access point, a router, an ethernet hub, etc. For example, some or all of the example modem 106, the example first media device 108A, the example second media device 108B may be communicatively coupled via ethernet in a manner that allows for all devices to be in communication. In some examples, the modem 106 may include one or more Ethernet connections to which one or more of the example monitoring radio 103A and the example backchannel radio 103B may be connected.

The example modem 106 includes a wireless access point supporting a wireless network forming the local network 104. In the illustrated example, the modem 106 receives data from the example gateway 110. The example gateway 110 communicatively couples the modem 106, and thereby the local network 104, to the external network 112 (e.g., the Internet). For example, the first media device 108A can request information from the external network 112 (e.g., a request for streaming media) by transmitting a request to the modem 106 via the local network 104. In this example, the example modem 106 then transmits the request to the gateway 110 that is then transmitted to the external network 112. In some examples, the aforementioned process can be reversed when information is transmitted from the external network 112 to the example first media device 108A.

The example first media device 108A and example second media device 108B are devices that retrieve media from the local network 104 for presentation. In some examples, one or both of the first media device 108A and example second media device 108B are capable of directly presenting media (e.g., via a display). In other examples one or both of the first media device 108A and example second media device 108B can present the media on separate media presentation equipment (e.g., speakers, a display, etc.). Thus, as used herein "media devices" may or may not be able to present media without assistance from a second device. Media devices are typically consumer electronics. For example, the first media device 108A and the second media device 108B of the illustrated example are a smartphone and laptop computer, respectively, and thus, are capable of directly presenting media (e.g., via an integrated and/or connected display and speakers). Any other type(s) and/or number(s) of media device(s) can additionally or alternatively be used. For example, Internet-enabled mobile handsets (e.g., a smartphone, an iPod®, etc.), video game consoles (e.g., Xbox One®, PlayStation 4®, etc.), tablet computers (e.g., an iPad®, a Motorola™ Xoom™, etc.), digital media players (e.g., a Roku® media player, a Slingbox®, a Tivo®, etc.), smart televisions, desktop computers, laptop computers, servers, etc. may additionally or alternatively be used.

The example gateway 110 allows information to be transmitted between the example local network 104 and the example external network 112. For example, the gateway 110 can route packets transmitted by the local network 104 (e.g., a wireless LAN) to the external network 112 (e.g., the Internet, a wide area network (WAN), etc.). In some examples, the example gateway 110 can be implemented as a hardware device and can be the same device as the example modem 106. In other examples, the gateway 110 can be implemented by software.

In operation, a user of the first media device 108A and/or the second media device 108B requests streaming media (e.g., via Netflix®, etc.), which can be transmitted via the local network 104, the example modem 106, the example gateway 110 and external network 112 to a server hosting the requested media (e.g., a Netflix® server, etc.). In this example, the requested streaming media is then transmitted back to the first media device 108A and/or the second media device 108B via the external network 112, the gateway 110, the modem 106 and the local network 104. When the requested media is transmitted back to the first media device 108A and/or the second media device 108B, the monitoring radio 103A snoops the transmission. In this example, the streaming meter 102 processes the snooped transmission and then transmits records of the transmission to an AME using the backchannel radio 103B. In some examples, the streaming meter 102 can remove network traffic associated with the backchannel radio 103B from the records before transmission to the AME. In some examples, this transmission is transmitted over the example local network 104.

Figure 2:
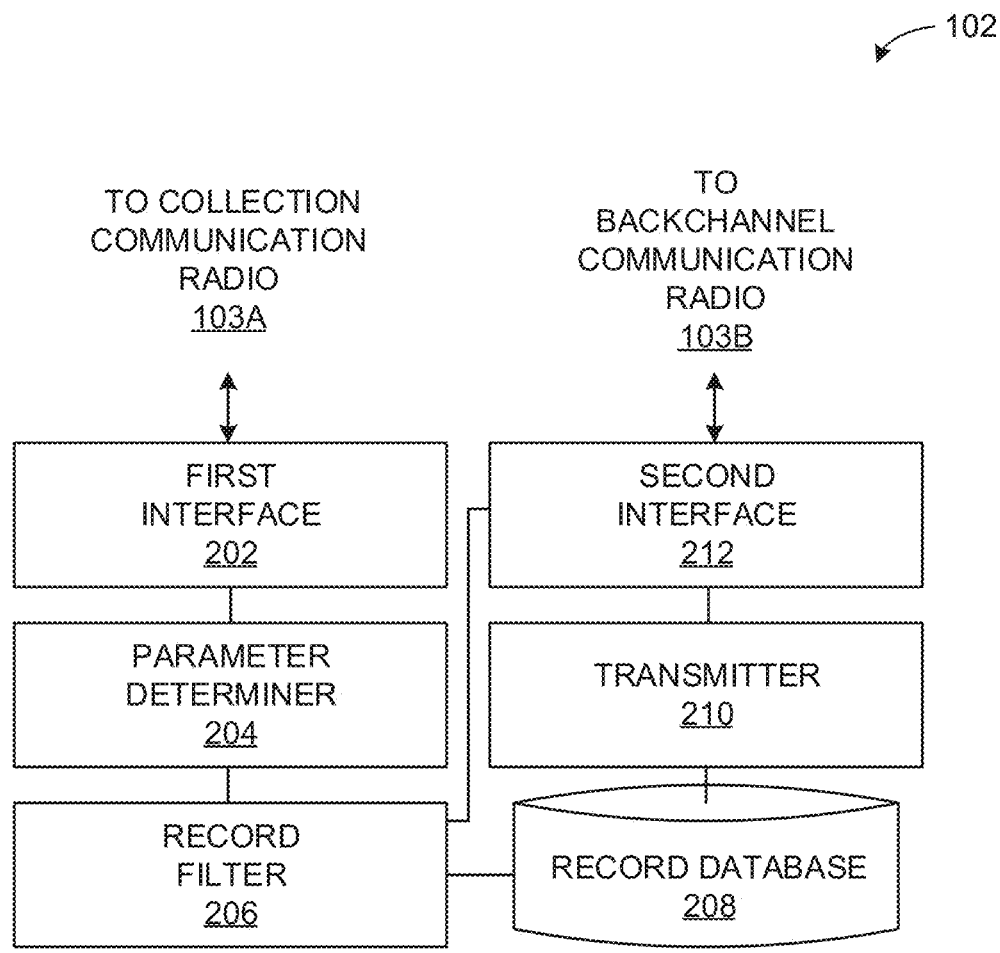
FIG. 2 is a block diagram an example implementation of the streaming meter of FIG. 1.

FIG. 2 is a block diagram of an example implementation of the streaming meter 102 of FIG. 1. The example streaming meter 102 includes an example first interface 202, an example parameter determiner 204, an example recorder filter 206, an example record database 208, an example transmitter 210 and an example second interface 212.

The example first interface 202 facilitates communication between the streaming meter 102 and the monitoring radio 103A. For example, the first interface 202 can cause the monitoring radio 103A to monitor traffic on the local network 114. In some examples, the first interface 202 facilitates communication between the parameter determiner 204 and the monitoring radio 103A. In some examples, the first interface 202 may process the collected traffic into records readable by the example parameter determiner 204. In some examples, the first interface 202 can use a network parameter (e.g., a WiFi service set identifier (SSID), an access code, a WiFi key, a password, etc.) to interpret the monitored network traffic. In some examples, the first interface 202 can use the network parameter to connect the streaming meter 102 to the local network 104. In some examples, the network parameter can be input by a user of the streaming meter 102 (e.g., the user may enter the WiFi password of the WiFi network in the streaming meter 102).

The example parameter determiner 204 analyzes the network traffic records to determine the parameters associated with each of the records. For example, the parameter determiner 204 of FIG. 2 determines the MAC address of the source of the network traffic. Additionally or alternatively, any other parameters related to the network traffic records may be determined (e.g., MAC address of the destination network traffic, Internet Protocol address (IP address) of the source and/or destination of network traffic, port name of the source and/or destination of network traffic, application related data indicated in the network traffic, etc.). In some examples, the determined parameters can be used to determine the origin device of each records.

The example record filter 206 removes records associated with a particular parameter(s). For example, the example record filter 206 removes records from the network traffic having parameter(s) related to the backchannel radio 103B (e.g., traffic associated with back channel communications the AME, etc.). In the illustrated example, the record filter 206 removes network traffic records that have a source MAC address or destination MAC address matching the MAC address of the backchannel radio 103B. In some examples, the record filter 206 can further remove other records (e.g., records that may be associated with privacy concerns).

The example record database 208 stores collected records to await transmission by the backchannel radio 103B. For example, the record database 208 can store collected records after being processed by the record filter 206. In some examples, records stored in the record database 208 can be sent out periodically (e.g., daily, weekly, etc.). Additionally or alternatively, records can be transmitted to the central facility once a certain quantity of records has been accumulated (e.g., a gigabyte of data, etc.) or based on an instruction from the AME (e.g., transmitted to the streaming meter 102 via the backchannel radio 103B). The record database 208 of the illustrated example is a database. Alternatively, the record database 208 may be implemented by any type of data storage device and/or data structure (e.g., a hard disk, a memory, a file, a buffer, a cache, etc.).

The example transmitter 210 processes the records stored in the record database 208 and prepares them for transmission by the second communication radio 106B. For example the example transmitter 210 packages the stored records in a format for transmission to the central facility. In some examples, the transmitter 210 can assign the relevant transmission parameters (e.g., MAC address, IP address, application data, etc.) to the records for transmission (e.g., applying OSI layers to data, etc.).

The example second interface 212 facilitates communication between the streaming meter 102 and the backchannel radio 103B. For example, the second interface 212 can cause the backchannel radio 103B to transmit the stored records to the central facility via the example local network 104 and the example gateway 110. In some examples, the second interface 212 can allow communication between the backchannel radio 103B and the transmitter 210. In some examples, the second interface 212 can process the packaged records into a format readable by the central facility.

In the illustrated example, the example second interface 212 and the example first interface 202 are depicted as separate elements. However, in other examples, the example first interface 202 and the example second interface 212 can be implemented as a single element. In this example, the single interface can interface both the monitoring radio 103A and the backchannel radio 103B to the streaming meter 102.

While an example manner of implementing the streaming meter 102 of FIG. 1 is illustrated in FIG. 2, one or more of the elements, processes, and/or devices illustrated in FIG. 2 may be combined, divided, re-arranged, omitted, eliminated, and/or implemented in any other way. Further, the example first interface 202, the example parameter determiner 204, the example record filter 206, the example record database 208, the example transmitter 210, the example second interface 212 and/or, more generally, the example streaming meter 102 of FIG. 1 may be implemented by hardware, software, firmware, and/or any combination of hardware, software, and/or firmware. Thus, for example, any of the example first interface 202, the example parameter determiner 204, the example record filter 206, the example record database 208, the example transmitter 210, the example second interface 212, and/or, more generally, the example streaming meter 102 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example first interface 202, the example parameter determiner 204, the example record filter 206, the example record database 208, the example transmitter 210 and/or the example second interface 212 is/are hereby expressly defined to include a non-transitory computer readable storage device or storage disk such as a memory, a digital versatile disk (DVD), a compact disk (CD), a Blu-ray disk, etc., including the software and/or firmware. Further still, the example streaming meter 102 of FIG. 1 may include one or more elements, processes, and/or devices in addition to, or instead of, those illustrated in FIG. 2, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
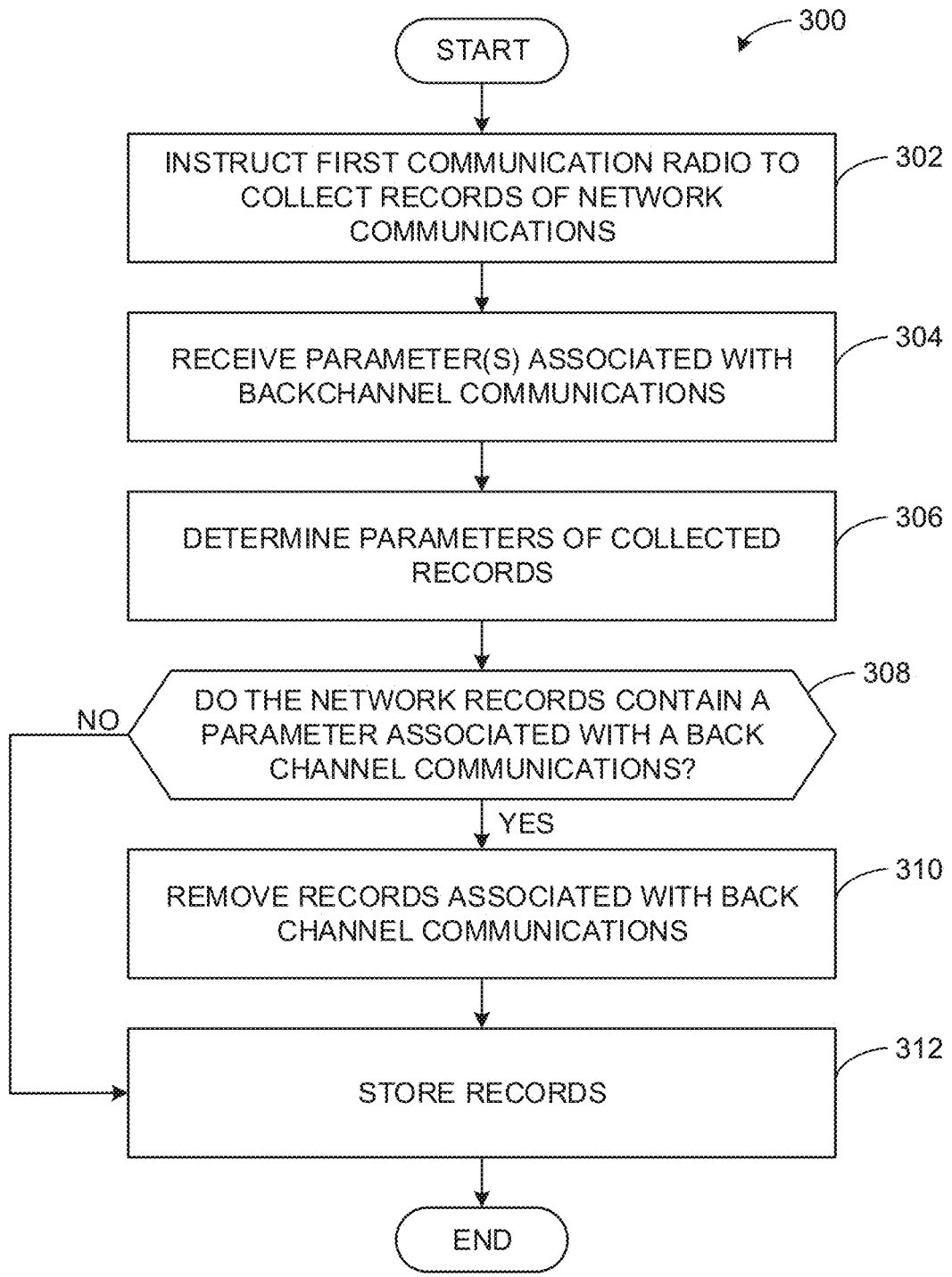
FIGS. 3 and 4 are flowcharts representative of machine readable instructions which may be executed to implement the streaming meter of FIGS. 1 and/or 2.
Figure 4:
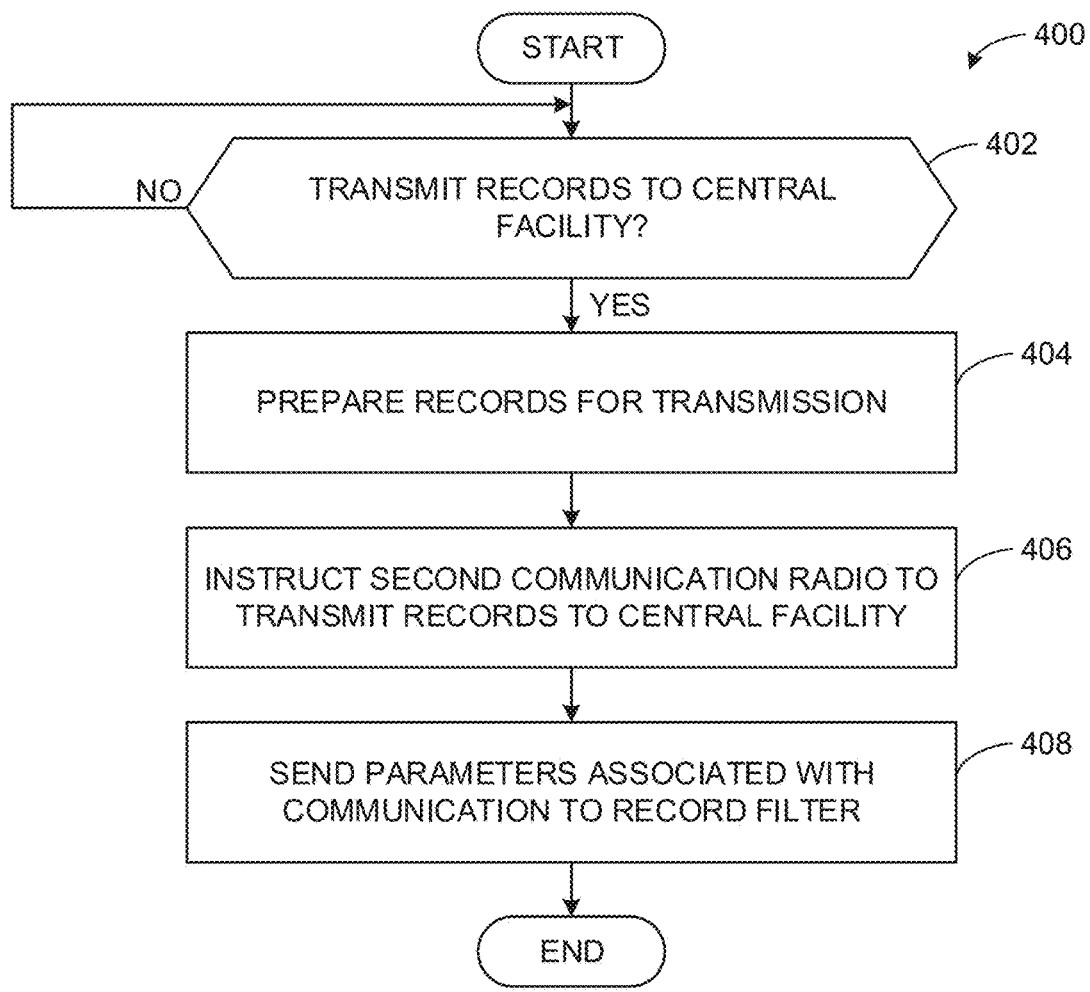

Flowcharts representative of example hardware logic, machine readable instructions, hardware implemented state machines, and/or any combination thereof for implementing the streaming meter 102 of FIG. 1 are shown in FIGS. 3 and 4. The machine readable instructions may be an executable program or portion of an executable program for execution by a computer processor such as the processor 512 shown in the example processor platform 500 discussed below in connection with FIG. 5. The program may be embodied in software stored on a non-transitory computer readable storage medium such as a CD-ROM, a floppy disk, a hard drive, a DVD, a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 4, many other methods of implementing the example streaming meter 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3 and 4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The program of FIG. 3 begins at block 302. At block 302, the first interface 202 instructs the monitoring radio 103A to collect records of network communications. For example, the first interface 202 may begin to collect records from the monitoring radio 103A. In some examples, the first interface 202 may format these signals in a way readable by the parameter determiner 204 (e.g., convert them into network traffic records).

At block 304, the record filter 206 receives parameter(s) associated with back channel communications. For example, the record filter 206 can receive the MAC address associated with the backchannel radio 103B. In other examples, the record filter 206 can receive any other parameter(s) associated with the backchannel radio 103B and/or second interface 212 (e.g., IP address, application specific data, etc.).

At block 306, the parameter determiner 204 determines parameters of the collected records. For example, the parameter determiner 204 can analyze the collected network traffic records to determine the parameters associated with each of the records. In some examples, the parameter determiner 204 can determine the MAC address(es) associated with the network traffic records. Additionally or alternatively, any other parameters related to the network traffic records may be determined (e.g., IP address, etc.).

At block 308, the record filter 206 determines if the network records contain a parameter associated with a back channel communication. If the network records contain records of back channel communications, the process 300 advances to block 310. If the network records do not contain records associated with back channel communications, the process 300 advances to block 312.

At block 310, the record filter 206 removes records associated with back channel communications. For example, the record filter 206 can remove records associated with the parameter received during the execution of block 306. In other examples, the record filter 206 can remove any other suitable records. In some examples, the record filter 206 can further prepare the records for storage by the record database 208. At block 312, the record database 208 stores the network traffic records. The process 300 then ends.

The program of FIG. 4 begins at block 402. At block 402, the transmitter 210 determines if the network records are to be transmitted to the central facility. If the records are to be transmitted to the central facility, the process 400 advances to block 404. If the records are not to be transmitted to the central facility, the process 400 restarts.

At block 404, the example transmitter 210 prepares the records for transmission. For example, the transmitter 210 may package the records and encode any information into the packaged records required for transmission over the local network 104. In some examples, transmitter 210 can assign the relevant transmission parameters (e.g., MAC address, IP address, application data) to the records for transmission (e.g., applying OSI layers to data).

At block 406, the example second interface 212, instructs the second communication radio to transmit the prepared records to the central facility. For example, the second interface 212 can cause the backchannel radio 103B to transmit the stored records to the central facility via the local network 104 and the gateway 110. At block 408, the second interface 212 sends parameters associated with the backchannel communication to record filter 206. For example, the second interface 212 can determine the parameter(s) (e.g., a MAC address, IP address, etc.) related to the backchannel communication (e.g., the communication of block 406). The process 400 then ends.

Figure 5:
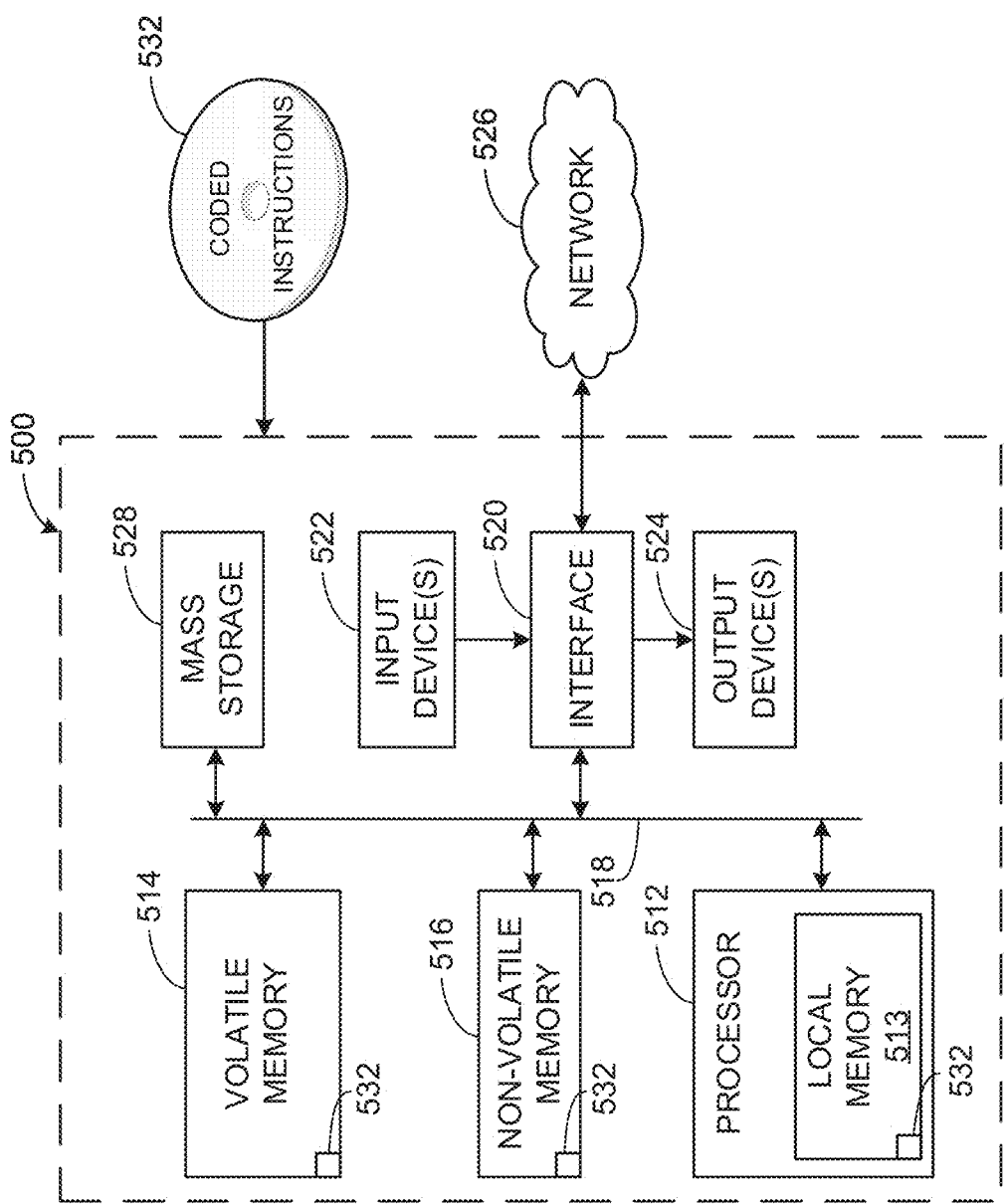
FIG. 5 is a block diagram of an example processing platform structured to execute the instructions of FIGS. 3 and/or 4 to implement the streaming meter of FIGS. 1 and/or 2.

FIG. 5 is a block diagram of an example processor platform 500 structured to execute the instructions of FIGS. 3 and 4 to implement the streaming meter of FIG. 2. The processor platform 500 can be, for example, a server, a personal computer, a workstation, a self-learning machine (e.g., a neural network), a mobile device (e.g., a cell phone, a smart phone, a tablet such as an iPad®), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 512 implements the example first interface 202, the example parameter determiner 204, the example record filter 206, the example record database 208, the example transmitter 210, and the example second interface 212.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC) interface, and/or a PCI express interface.

In the illustrated example, one or more input devices 522 are connected to the interface circuit 520. The input device(s) 522 permit(s) a user to enter data and/or commands into the processor 512. The input device(s) 522 can be implemented by, for example, an audio sensor, a microphone, a camera (still or video), a keyboard, a button, a mouse, a touchscreen, a track-pad, a trackball, an isopoint device, and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 520 of the illustrated example, thus, typically includes a graphics driver card, a graphics driver chip, and/or a graphics driver processor.

The interface circuit 520 of the illustrated example also includes a communication device such as a transmitter, a receiver, a radio, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 500 of the illustrated example also includes one or more mass storage devices 528 for storing software and/or data. Examples of such mass storage devices 528 include floppy disk drives, hard drive disks, compact disk drives, Blu-ray disk drives, redundant array of independent disks (RAID) systems, and digital versatile disk (DVD) drives.

The machine executable instructions 532 of FIGS. 3 and 4 may be stored in the mass storage device 528, in the volatile memory 514, in the non-volatile memory 516, and/or on a removable non-transitory computer readable storage medium such as a CD or DVD.

From the foregoing, it will be appreciated that example methods, apparatus and articles of manufacture have been disclosed that reduce the bandwidth and computing requirements of a computer at the central facility of an AME. By preventing unneeded information from being transmitted to the central facility, the example methods, apparatus and articles of manufacture improve the efficiency of using a computer device at the central facility by reducing the amount of records that need to be processed. By locally filtering records at a streaming meter, a computing device at central facility does not have to determine the MAC address associated with the backchannel radio of each streaming meter (potentially tens of thousands). Additionally, information (e.g., the MAC address) required to filter backchannel communications from the gathered network traffic records may be removed from the records during transmission to the AME. The disclosed methods, apparatus and articles of manufacture are accordingly directed to one or more improvement(s) in the functioning of a computer.

What is claimed is:

1. An apparatus including:
a first means for communicating to collect first records of first network traffic on a communication network;
a second means for communicating to transmit, via a network communication, the first records identifying a portion of the first network traffic to an audience measurement entity;
the first means for communicating to collect second records of second network traffic on the communication network, the second network traffic including the network communication;
means for determining a MAC address of the second means for communicating;
means for record filtering to remove the network communication associated with the MAC address from the records; and
the second means for communicating to transmit the second records to the audience measurement entity, the first records and the second records including media monitoring data about media presented via the communication network.

2. The apparatus of claim 1, further including:
first means for facilitating communication between the means for determining the MAC address and the first means for communicating; and
second means for facilitating communication between the means for record filtering and the second means for communicating.

3. The apparatus of claim 1, wherein the second means for communicating is to at least one of transmit the first records identifying the portion of the first network traffic to a gateway and the gateway is to transmit the first records to the audience measurement entity or the second records identifying a portion of the second network traffic to the gateway and the gateway is to transmit the second records to the audience measurement entity.

4. The apparatus of claim 3, wherein the audience measurement entity is to use at least one of the first network traffic or the second network traffic to generate audience measurement data.

5. The apparatus of claim 3, wherein the gateway is connected to a modem, the modem including an access point sharing the communication network.

6. The apparatus of claim 3, wherein at least one of the first network traffic or the second network traffic includes requests to the gateway for streaming media.

7. The apparatus of claim 1, wherein the communication network is a local area network (LAN) network.

8. An apparatus comprising:
memory including instructions;
a first communication radio;
a second communication radio;
a processor to execute the instructions, the instructions, which when executed, cause the processor to:
collect, via the first communication radio, first records of first network traffic on a communication network;
transmit, via a network communication using the second communication radio, the first records to an audience measurement entity;
collect, via the second communication radio, second records of second network traffic on the communication network, the second network traffic including the network communication;
determine a MAC address of the second communication radio;
remove the network communication from the second records, the network communication identified based on the MAC address; and
transmit the second records to an audience measurement entity, the first records and the second records including media monitoring data about media presented via the communication network.

9. The apparatus of claim 8, wherein the transmitting of at least one of the first or second records to the audience measurement entity includes transmitting the at least one of the first or second records to a gateway, the gateway to transmit the at least one of the first or second records to the audience measurement entity.

10. The apparatus of claim 9, wherein the audience measurement entity is to use the at least one of the first network traffic or the second network traffic to generate audience measurement data.

11. The apparatus of claim 9, wherein the at least one of the first network traffic or the second network traffic includes requests to the gateway for streaming media.

12. The apparatus of claim 9, wherein the gateway is connected to a modem, the modem generating the communication network.

13. The apparatus of claim 8, wherein the communication network is a local area network (LAN) network.

14. A method, comprising:
transmitting, via a first communication radio, first records of first network traffic on a communication network to an external location;
determining a parameter associated with the transmission of the first records of the first network traffic;
monitoring, via a second communication radio, second records of second network traffic on the communication network; and
removing, from the second records, traffic detected by the second communication radio based on the parameter determined to be associated with a communication carrying the first records in the transmission of the first records via the first communication radio to remove, from the second records, one or more of the first records originating from the first communication radio having the parameter associated with the transmission of the first records.

15. The method of claim 14, further including transmitting the second records to the external location.

16. The method of claim 15, wherein the external location is associated with an audience measurement entity and the second records include media monitoring data about media presented via the communication network.

17. The method of claim 16, wherein the audience measurement entity is to use at least one of the first network traffic or the second network traffic to generate audience measurement data.

18. The method of claim 16, wherein the second network traffic includes requests to a gateway for streaming media.

19. The method of claim 14, wherein the communication network is a local area network (LAN) network.

20. The method of claim 14, wherein the parameter includes a MAC address.

21. The method of claim 14, wherein the filtering of the traffic from the second records is performed by processor circuitry at a monitoring meter located in a monitoring environment.

* * * * *